(12) United States Patent
Noelke et al.

(10) Patent No.: US 7,803,277 B2
(45) Date of Patent: Sep. 28, 2010

(54) PROCESS FOR REMOVING FLUOROSURFACTANT FROM AN AQUEOUS FLUOROPOLYMER DISPERSION USING SORBENT POUCHES

(75) Inventors: Charles Joseph Noelke, Southern Pines, NC (US); Clay Woodward Jones, Fort Collins, CO (US); Daniel N. Levy, Tannay (CH); Michael Gene McClusky, Washington, WV (US); David William Johnson, Washington, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/030,379

(22) Filed: Feb. 13, 2008

(65) Prior Publication Data

US 2008/0135488 A1 Jun. 12, 2008

Related U.S. Application Data

(63) Continuation of application No. 11/194,401, filed on Aug. 1, 2005, now abandoned.

(60) Provisional application No. 60/600,693, filed on Aug. 11, 2004.

(51) Int. Cl.
*C08F 6/28* (2006.01)
(52) U.S. Cl. .................. 210/670; 210/683; 210/692; 523/310
(58) Field of Classification Search ................ 210/282, 210/660, 681, 670, 683, 691, 692; 523/310; 524/544
See application file for complete search history.

(56) References Cited

U.S. PATENT DOCUMENTS

| | | | |
|---|---|---|---|
| 2,559,752 A | 7/1951 | Berry | |
| 2,749,307 A | 6/1956 | Ellison | |
| 2,863,889 A | 12/1958 | Marks | |
| 3,037,953 A | 6/1962 | Marks et al. | |
| 3,704,272 A | 11/1972 | Holmes | |
| 3,882,153 A | 5/1975 | Seki et al. | |
| 4,025,427 A | 5/1977 | Loeb | |
| 4,282,162 A | 8/1981 | Kuhls | |
| 4,369,266 A | 1/1983 | Kuhls et al. | |
| 4,380,618 A | 4/1983 | Khan et al. | |
| 6,706,193 B1 | 3/2004 | Burkard et al. | |
| 6,720,437 B2 | 4/2004 | Jones et al. | |
| 6,833,403 B1 | 12/2004 | Bladel et al. | |
| 6,861,466 B2 | 3/2005 | Dadalas et al. | |
| 7,041,728 B2 | 5/2006 | Zipplies et al. | |
| 2002/0151748 A1 | 10/2002 | Jones et al. | |
| 2003/0054122 A1 | 3/2003 | Forbes et al. | |
| 2005/0070633 A1 | 3/2005 | Epsch et al. | |

FOREIGN PATENT DOCUMENTS

| | | |
|---|---|---|
| EP | 0 818 506 B1 | 5/2000 |
| EP | 1 155 055 B1 | 4/2003 |
| EP | 1 364 972 A1 | 11/2003 |
| EP | 1 382 593 A2 | 1/2004 |
| EP | 1382593 B1 | 3/2009 |
| WO | WO 03/051988 A2 | 6/2003 |
| WO | 2006020721 A1 | 2/2006 |

OTHER PUBLICATIONS

Internet Article "Continuous Ion Exchange", Rensselaer PolyTechnic Institute, Department of Chemical and Biological Engineering, Troy, NY http://www.rpi.edu/dept/chem-eng/Biotech-Environ/IONEX/continuo.htm, Apr. 18, 1995.
Office Action mailed Jul. 10, 2008, in co-pending U.S. Appl. No. 11/194,257.
Office Action mailed Nov. 12, 2008, in co-pending U.S. Appl. No. 11/194,257.
Office Action mailed Sep. 15, 2009, in co-pending U.S. Appl. No. 11/194,257.
Office Action mailed Dec. 22, 2009, in co-pending U.S. Appl. No. 11/194,257.

*Primary Examiner*—Matthew O Savage

(57) ABSTRACT

A process for reducing the fluorosurfactant content of an aqueous fluoropolymer dispersion by filling a container with fluoropolymer dispersion, inserting into the container a fabric pouch containing a fluorosurfactant sorbent so that the sorbent contacts the fluorosurfactant-containing aqueous fluoropolymer dispersion in the container and retains the fluorosurfactant to reduce fluorosurfactant content of said fluorosurfactant-containing aqueous fluoropolymer dispersion, and removing the fabric pouch from the container.

16 Claims, No Drawings

PROCESS FOR REMOVING FLUOROSURFACTANT FROM AN AQUEOUS FLUOROPOLYMER DISPERSION USING SORBENT POUCHES

RELATED APPLICATIONS

This application is a continuation of U.S. patent application Ser. No. 11/194,401 filed on Aug. 1, 2005, now abandoned, which claims the benefit of U.S. Provisional Patent Application Ser. No. 60/600,693 filed on Aug. 11, 2004.

FIELD OF THE INVENTION

This invention relates to a process for removing fluorosurfactant from aqueous fluoropolymer dispersions.

BACKGROUND OF THE INVENTION

As described In U.S. Pat. No. 2,559,752 to Berry, fluorosurfactants are used as a polymerization aid in the dispersion polymerization of fluoropolymers functioning as a non-telogenic dispersing agent. As has been further taught in U.S. Pat. No. 3,882,153 (Seki et al) and U.S. Pat. No. 4,282,162 (Kuhls), these expensive fluorosurfactants can be recovered either from the aqueous phase after the polymer has been coagulated from the dispersion or in the aqueous polymer dispersions prior to concentration. A preferred method of recovering the fluorosurfactant from the fluoropolymer dispersion as taught in both Kuhls and Seki et al. is by adsorption onto an ion exchange resin.

Fluoropolymer manufacturing processes that involve ion exchange adsorption as an added process step suffer from several disadvantages. For example, a process employing the addition of ion exchange resin to the dispersion in a stirred tank, typically in the form of resin beads, requires long contact times with stirring to effect the adsorption of the fluorosurfactant. In practical terms, the rate of adsorption is limited by the rate and efficacy of the stirring; the amount, bead size, and condition of the ion exchange resin; the relative chemical potentials of the particular ion exchange resin being used and anions to be exchanged; and the temperature. Because of such limitations, the recovery of the fluorosurfactant from the fluoropolymer dispersion using ion exchange resin as disclosed in the prior art takes a number of hours, i.e., typical treatment times longer than a typical polymerization cycle. Thus, in order to avoid increasing the length of the total manufacturing cycle time, either multiple tanks or a tank large enough to receive several polymerization batches must be used and the ion exchange step must be run with high production efficiency.

Another disadvantage of the prior art method is that the shearing forces associated long stirring times has the propensity to cause some agglomeration of the primary polymerization particles forming large particles resulting in poorer dispersion stability due to particle settling. Further, the amount of ion exchange resin necessary with the prior art method to keep the time of the ion exchange adsorption short so as to keep up with batch polymerization cycles can require about 3 times the amount necessary to achieve the same level of fluorosurfactant reduction that could be achieved if longer contact times were available.

If the dispersion is passed through a fixed bed of ion exchange instead of using stirred resin beads, the rate of exchange is also slow, limited by the necessity of the dispersion to pass through the bed at a sufficiently slow rate to provide adequate fluorosurfactant adsorption. The slow passage through the ion exchange bed leads to the first portion of the dispersion having all of the fluorosurfactant removed. Later portions have lesser amounts removed as the top of the bed becomes progressively more exhausted. The final portion may have little of the fluorosurfactant removed as the bed reaches exhaustion. Care must be exercised in later blending so that the final product does not vary as a result of differences in bed exhaustion. Moreover, much labor or capital for mechanical equipment must be employed to replenish or replace the ion exchange resin in the vessel containing the fixed bed. The overall rate compares with the stirred bead technique.

What is desired is an efficient manufacturing process for fluoropolymer dispersion which recovers fluorosurfactant directly from dispersion without increasing the dispersion production cycle time, avoids the need for larger scale production equipment, and provides high quality, uniform product without shearing damage and particle agglomeration.

BRIEF SUMMARY OF THE INVENTION

The present invention relates to a process for reducing the fluorosurfactant content of an aqueous fluoropolymer dispersion by filling a container with fluoropolymer dispersion, inserting into the container a fabric pouch containing a fluorosurfactant sorbent so that the sorbent contacts the fluorosurfactant-containing aqueous fluoropolymer dispersion in the container and retains the fluorosurfactant to reduce fluorosurfactant content of said fluorosurfactant-containing aqueous fluoropolymer dispersion, and removing the fabric pouch from the container.

In preferred forms of the process, additional process steps are employed which include treating the sorbent in the fabric pouch after contacting the dispersion to remove the fluorosurfactant, reusing the fabric pouch, and/or recovering the fluorosurfactant for reuse. It is also preferable to move either the fluorosurfactant-containing aqueous fluoropolymer dispersion or the pouch to impart relative movement during contacting.

DETAILED DESCRIPTION OF THE INVENTION

Fluoropolymer Dispersions

The invention is useful for reducing the fluorosurfactant content of fluorosurfactant-containing aqueous fluoropolymer dispersions. Such dispersions are made by dispersion polymerization (also known as emulsion polymerization). The fluoropolymer dispersions are comprised of particles of polymers made from monomers wherein at least one of the monomers contains fluorine. The particles have a relative colloid stability obtained by the presence of a nonionic surfactant. The product of dispersion polymerization is used as aqueous dispersion after concentrating and/or stabilizing with added non-ionic surfactant as will be described below. The concentrated dispersions are useful as coating or impregnating compositions and to make cast films.

The fluoropolymer component of the aqueous dispersions used in this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

The invention is especially useful when the fluoropolymer component of the dispersion may be polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modified PTFE contains a small amount of comonomer modifier which improves film forming capability during baking (fusing), such as perfluoroolefin, notably hexafluoropropylene (HFP) or perfluoro (alkyl vinyl)ether (PAVE), where the alkyl group contains 1 to 5 carbon atoms, with perfluoro(ethyl vinyl) ether (PEVE) and perfluoro(propyl vinyl)ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1 \times 10^9$ Pa·s. Such high melt viscosity indicates that the PTFE does not flow in the molten state and therefore is not melt-processable. PTFE and modified PTFE are frequently sold in dispersion form and transported in containers and the process of the invention can be readily employed for reducing the fluorosurfactant content of such dispersions.

The fluoropolymer component of the dispersion may be melt-processable. By melt-processable, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride (PVDF) and copolymers of vinylidene fluoride as well as polyvinyl fluoride (PVF) and copolymers of vinyl fluoride.

A typical process for the aqueous dispersion polymerization of preferred polymer PTFE is a process wherein TFE vapor is fed to a heated reactor containing a weak acid, fluorosurfactants, paraffin wax and deionized water. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and polymer dispersion is transferred either to a coagulation operation where fine power is produced or a dispersion concentration operation which produces dispersions which are especially useful for the practice of the present invention. In the dispersion concentration operation, the dispersion contained in a vessel is concentrated with the aid of a nonionic surfactant as taught in Marks et al in U.S. Pat. No. 3,037,953 and U.S. Pat. No. 3,704,272 to Holmes to raise the solids from nominally 35 wt % to about 60 wt %. Typically, the dispersion is then transferred to containers.

The dispersion polymerization of melt-processable TFE copolymers is similar except that one or more comonomers are added to the batch initially and/or introduced during polymerization. In addition, a telogen such as a hydrocarbon is employed to control the molecular weight to achieve the desired melt flow of the polymer for the intended purpose. The same dispersion concentration operation used for PTFE dispersions can be used for TFE copolymer dispersions.

Fluorosurfactant fluoropolymer dispersions with solids content of 15-70 wt %, preferably 25-65 wt %, are beneficially treated by the present invention.

Process

The present invention is carried out by filling a container with fluorosurfactant-containing aqueous fluoropolymer dispersion. By the term "container" is meant any vessel designed to hold fluoropolymer dispersion after polymerization, either temporarily prior to after processing or for longer term storage or/or shipping. Such containers include storage and/or processing tanks and shipping containers such as totes, storage drums, plastic lined fiberboard boxes and the like.

The present invention achieves reduction of fluorosurfactant content by contacting the fluorosurfactant containing fluoropolymer dispersion with a sorbent in a pouch inserted into the container. By the term "sorbent" is meant materials that remove fluorosurfactant from fluoropolymer dispersion, whether through absorption or adsorption or other mechanism. The process is advantageously employed for reducing fluorosurfactant content of the dispersion while it is housed in the container temporarily prior to or after processing or during shipping or longer term storage. Preferably, the process is carried out during the manufacture of the aqueous fluoropolymer dispersion. For the purposes of this patent application, "manufacture of the aqueous fluoropolymer dispersion" includes dispersion manufacturing process steps prior to filling shipping containers, More preferably, the process is carried out as part of the dispersion concentration operation or during temporary storage prior to filling shipping containers. A fixed vessel is advantageously used for carrying out this preferred form of the invention. For example, the process of this invention may advantageously be employed in the vessel used for concentrating the dispersions by inserting the sorbent pouches into the vessel. The process is advantageously employed after the addition of nonionic surfactant, which is done in any event as part of the concentration process, and either before or after concentration is performed. Accordingly, there is no need to add an operation or equipment to the manufacturing process specifically devoted to fluorosurfactant removal that will impact the cycle time of the overall production.

The contact time to achieve sorption in a container can be short if desired, e.g., 2 hours, or leisurely, extending as long 6 months or more if storage or shipping containers are used. Preferably the contact time is about 1 week to about 6 months, more preferably about 1 week to about 3 months. Preferably, the specific process steps, apparatus and sorbent quantity are selected to achieve the desired level of fluorosurfactant reduction during the temporary or long term storage. Most preferably, the process is carried out during the concentration operation or during temporary storage prior to filling shipping containers. The time available during these periods typically provides sufficient time to reduce the fluorosurfactant content so that there is no added cycle time inventory costs associated with holding product in inventory longer than normal. For this form of the invention, it is preferable the quantity of sorbent and process conditions to be selected so that the contact time is about 2 to about 8 hours. Typically, sufficient time is available to allow high utilization of the sorbent and the amount of sorbent used is minimized and can approach the stoichiometric amount required for fluorosurfactant removal.

The sorbent may be in the form of pellets or beads of suitable size for use in the fabric pouch employed in accordance with the invention. The fabric pouch containing the sorbent is made of fabric which is chemically stable and sufficiently durable for containing the sorbent in the dispersion. The pouch also has an sufficiently open structure to be porous and allow dispersion to permeate and permit sorption of fluorosurfactant on the sorbent thereby reducing the fluorosurfactant content of the dispersion yet, at the same time, preventing the sorbent employed from escaping and mixing into the dispersion. More preferably, the fabric pouch is made from a woven or nonwoven filter cloth such as polypropylene. Since multiple fabric pouches can be employed to provide necessary amount of sorbent to reduce the fluorosurfactant to the desired level, the fabric pouches can be sized for ease of handling. Preferably, the pouches are sized to contain about 0.5 to about 25 kilograms of sorbent.

The fabric pouches are used by inserting them into the container, either before or after filling with fluorosurfactant-containing dispersion. Since the sorbent typically will tend to float in the dispersion it, is preferred to support the fabric pouches in the container so that they are below the surface. This can be accomplished by any suitable means such as by employing weights, tying pouches to points in the container below the surface, or employing structures such as rods which hold the fabric pouches below the surface.

In a preferred embodiment of this invention, the process includes moving either the fluorosurfactant-containing aqueous fluoropolymer dispersion or the sorbent pouches to impart movement in relation to each other during the contacting in the container. In the preferred embodiment of the process in which the dispersion is held in a temporary storage tank prior to filing shipping containers, relative movement is preferably achieved by placing the sorbent pouches in fixed positions in the tank circulating the dispersion in the tank using a pump or impeller to provide circulation. Alternatively, a mechanism can be used which moves the sorbent pouches in relation to the dispersion.

One type of shipping container in which the process can be carried out is often referred to as a tote. Such a container is molded plastic vessel, preferably molded polypropylene, housed in a steel wire enclosure giving the vessel added integrity. The container sits on a metal or wooden skid which aids in the lifting, transporting and stacking of the container. The walls of the vessel are approximately 3/16 inch thick and the capacity of the container is about 275 gallons. For moving the dispersion in relation to the fabric pouches in a tote, a screw pump is preferably employed, preferably inserted into the fill opening for the tote.

An additional advantage of moving the dispersion in relation to the fabric pouches during storage is that movement of the dispersion can ameliorate the long standing problem of short shelf life due to settling. Many fluoropolymer dispersions suffer from settling as the specific gravity of the fluoropolymer is large relative to water. In as little as 3 months, 2 to 20% of the dispersion can form a non-redispersable settled layer which represents a yield loss and waste disposal issue. Further, such a mechanism permits handling of dispersions having particles of large size and/or high aspect ratio, which dispersions are desired for the formation of flaw free films with enhanced critical cracking thickness (CCT). The continuous, gentle movement of the dispersion in the package can overcome settling deficiencies which are exaggerated by large particle size dispersions as well as provide the mass transfer which sorption such as by ion exchange requires.

In contrast to the prior art, the present invention is especially useful by being readily able to treat upconcentrated dispersions with solids content as high as 70%. Even though the higher density and decreased low rates of these compositions would be problematic in a stirred tank or extraction column where a high stirring or flow rate is necessary to achieve adequate reduction in fluorosurfactant content during the time available, such considerations are a minor concern when sorbent pouches are contacted with the concentrated dispersions in a container. By conducting the fluorosurfactant reduction in a container during holding periods in manufacture or during storage or shipping, sufficient contact time between the sorbent and the dispersion is available, even for more viscous liquids, and high stirring or flow rates are not needed.

The present invention permits reducing the fluorosurfactant content of a fluorosurfactant-containing dispersion to a predetermined level, preferably a level no greater than about 300 ppm, more preferably a predetermined level no greater than about 100 ppm, especially a predetermined level no greater than about 50 ppm. Based on the expected contact time during holding periods in manufacture or during storage and shipping, the amount of the sorbent is selected to reduce the fluorosurfactant content to no greater than the desired predetermined level.

Fluorosurfactants

The fluorosurfactant in the fluorosurfactant-containing dispersions to be reduced in this process is a non-telogenic, ionizable dispersing agent, soluble in water and comprising an ionic hydrophillic group and a hydrophobic portion. Preferably, the hydrophobic portion is an aliphatic fluoroalkyl group containing at least six carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and because they do not chain transfer they inhibit formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Sorbents

Examples of possible sorbents include carbon particles and ion exchange resins. For the practice of this invention, the sorbent is preferably an ion exchange resin, more preferably anionic and can be either weakly basic or strongly basic. Suitable weakly basic anion exchange resins contain primary, secondary amine, tertiary amine, or hydroxy amino groups in the form of the ammonium salts. Suitable strongly basic anion exchange resin contain quaternary ammonium groups. Strong base ion exchange resins have the advantage of less sensitivity to the pH of the media. Ion exchange resins in the form of a hydroxyl counter ion are preferred. Ion exchange resins with chloride, sulfate, and nitrate have also been used for the removal of the fluorosurfactant. Examples of suitable commercially-available ion exchange resins include: Dowex 550A, US Filter A464-OH, US Filter A244-OH, Sybron M-500-OH, Sybron ASB1-OH, Purolite A-500-OH, Itochu TSA 1200, Amberlite IR 402

Treatment of the sorbent in the fabric pouches to remove fluorosurfactant can be performed by elution. Elution of fluorosurfactant such as a perfluorinated carboxylic acid adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, concentration etc.

In a further preferred aspect of employing this invention, elution of the fluorosurfactant is performed with the sorbent contained within said fabric pouch. It is advantageous to carry out the regeneration of the sorbent and/or recovery of the fluorosurfactant with the sorbent contained in the fabric pouch since the fabric pouch readily permits flow and aids in handling of the sorbent during the recovery and/or regeneration and during subsequent handling and storage. Employing this form of the invention, the fabric pouches can then be reused for reducing the fluorosurfactant content of a fluoropolymer dispersion and the fluorosurfactant in the eluent to be recovered for reuse. If desired, the recovered fluorosurfactant can be recycled for use in the manufacture of additional fluoropolymer.

What is claimed is:

1. A process for reducing fluorosurfactant content of a fluorosurfactant-containing aqueous fluoropolymer dispersion comprising:
    filling a container with said fluorosurfactant-containing aqueous fluoropolymer dispersion, said dispersion having a fluoropolymer solids concentration of about 15 to about 70 weight percent and defining an upper surface;
    inserting into said container a fabric pouch containing a fluorosurfactant sorbent so that said sorbent contacts said fluorosurfactant-containing aqueous fluoropolymer dispersion in said container and retains said fluorosurfactant to reduce fluorosurfactant content of said fluorosurfactant-containing aqueous fluoropolymer dispersion;
    providing means for supporting said fabric pouch in said container so that said pouch remains positioned below said upper surface of said dispersion;
    moving either said fluorosurfactant-containinq aqueous fluoropolymer dispersion or said pouch to impart movement in relation to each other during said contacting while maintaining said pouch below said upper surface of said dispersion without causing shearing damage or particle agglomeration of said fluoropolymer solids; and
    removing said fabric pouch from said container, wherein said process is carried out during the manufacture of the aqueous fluoropolymer dispersion as part of the dispersion concentration operation or during temporary storage prior to filling shipping containers.

2. The process of claim 1 further comprising treating said sorbent in said fabric pouch to remove said fluorosurfactant.

3. The process of claim 2 further comprising reusing said fabric pouch in the process of claim 1.

4. The process of claim 2 further comprising recovering said fluorosurfactant for reuse.

5. The process of claim 1 where said sorbent is ion exchange resin.

6. The process of claim 5 wherein said ion exchange resin is anion exchange resin.

7. The process of claim 1 wherein the amount of said sorbent contacted with said fluorosurfactant-containing aqueous fluoropolymer dispersion is selected to reduce the fluorosurfactant content to no greater than a predetermined level.

8. The process of claim 7 wherein said predetermined level is no greater than about 300 ppm.

9. The process of claim 7 wherein said predetermined level is no greater than about 100 ppm.

10. The process of claim 7 wherein said predetermined level is no greater than about 50 ppm.

11. The process of claim 1 further comprising moving said pouch in relation to the dispersion during said contacting.

12. The process of claim 1 further comprising moving said dispersion in relation to said pouch during said contacting.

13. The process of claim 1 wherein said fluoropolymer dispersion is a concentrated fluoropolymer dispersion containing nonionic surfactant.

14. The process of claim 1 wherein said dispersion has a fluoropolymer solids concentration of about 25 to about 65 weight percent.

15. The process of claim 1 wherein said process is carried out during the manufacture of the aqueous fluoropolymer dispersion.

16. The process of claim 1 wherein said container is a fixed vessel.

* * * * *